L. KING.
VALVE GEAR.
APPLICATION FILED AUG. 28, 1908.
921,413. Patented May 11, 1909.
2 SHEETS—SHEET 1.
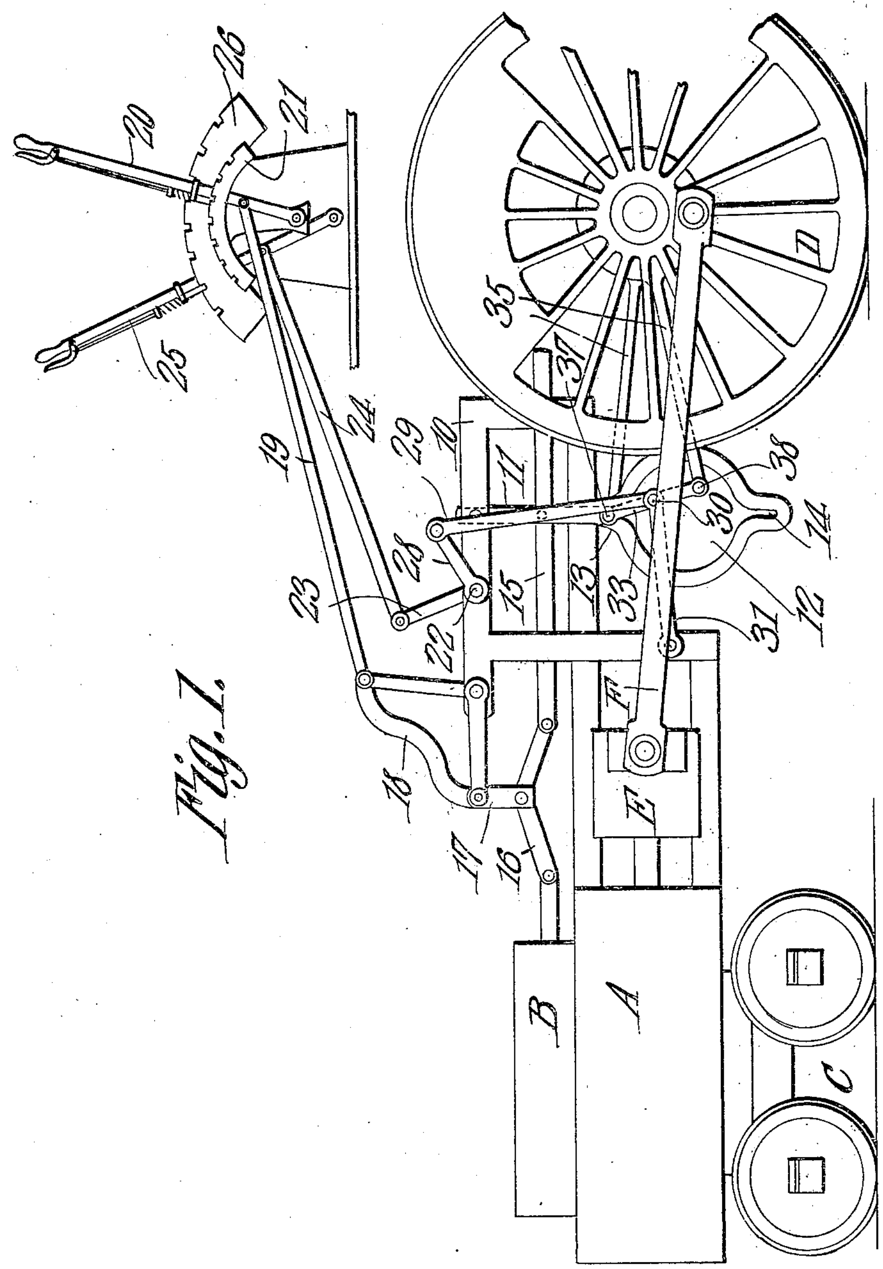
Witnesses
E. G. Stewart
Jno E. Parker
Inventor
Lynn King.
By C. A. Snow & Co.
Attorneys
THE NORRIS PETERS CO., WASHINGTON, D.C.

L. KING.
VALVE GEAR.
APPLICATION FILED AUG. 28, 1908.
921,413. Patented May 11, 1909.
2 SHEETS—SHEET 2.
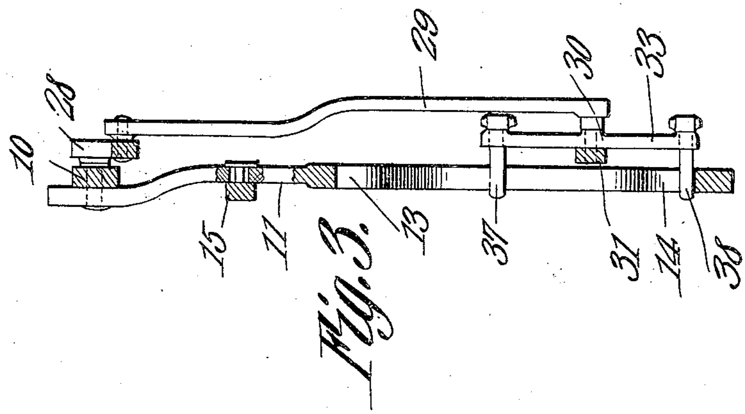
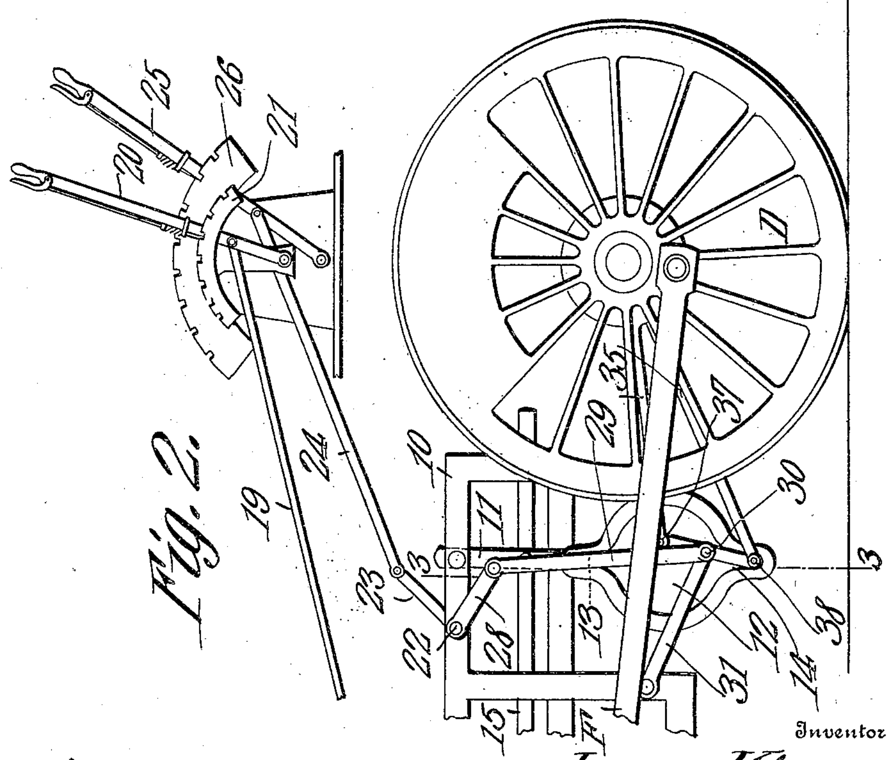
Witnesses
Inventor
Lynn King.
By C. A. Snow & Co.
Attorneys
THE NORRIS PETERS CO., WASHINGTON, D. C.

UNITED STATES PATENT OFFICE.

LYNN KING, OF LYMAN, MISSISSIPPI.

VALVE-GEAR.

No. 921,413. Specification of Letters Patent. Patented May 11, 1909.

Application filed August 28, 1908. Serial No. 450,730.

*To all whom it may concern:*

Be it known that I, LYNN KING, a citizen of the United States, residing at Lyman, in the county of Harrison and State of Mississippi, have invented a new and useful Valve-Gear, of which the following is a specification.

This invention relates to locomotive valve gear and has for its principal object to provide a novel form of gearing in which the usual link motion is dispensed with, provision being made for readily adjusting the point of cut off of the valve, and for securing reverse of the engine when desired.

A further object of the invention is to provide a novel means for readily altering the lead of the valve.

With these and other objects in view, as will more fully hereinafter appear, the invention consists in certain novel features of construction and arrangement of parts, more fully hereinafter described, illustrated in the accompanying drawings, and more particularly pointed out in the appended claims, it being understood that various changes in the form, proportion, size and minor details of construction may be made without departing from the spirit or sacrificing any of the advantages of the invention.

In the accompanying drawings:—Figure 1 is a side elevation of a locomotive valve gear constructed in accordance with the invention. Fig. 2 is a similar view of a portion of the same showing the parts reversed. Fig. 3 is a vertical section on the line 3—3 of Fig. 2, the view being drawn to an enlarged scale.

Similar characters of reference are employed to indicate corresponding parts throughout the several figures of the drawings.

In Fig. 1 there are shown the usual cylinder A, steam chest B, pilot wheels C and the front driver D, all of which may be of the ordinary construction. The piston is connected to a cross head E, and transmits motion to the forward driver through a connecting rod F.

Mounted on the upper cross head guide is a frame 10 to which is pivoted a bar 11, the lower portion of which has an enlarged loop 12 approximately circular in form, the upper and lower walls of the opening being continued in the form of vertical slots 13 and 14, both of which are arranged in the longitudinal axis of the bar 11. This bar receives motion in the manner hereinafter described and transmits motion to the valve rod 15, there being a pin and slot connection between the bar and rod in order to allow the free oscillatory movement of the bar. The valve rod is made in two sections, and these are connected by a toggle joint 16 that is suspended from a link 17 carried by the approximately horizontal arm of a bell crank lever 18 that is pivoted on the frame 10. The approximately vertical arm of the bell crank lever is connected by a rod 19 to a lever 20 that is provided with the usual latch bolt movable over a notched locking quadrant 21 in the cab of the engine. By moving the lever 20 the link 17 may be raised or lowered and the distance between the two sections of the valve rod may be correspondingly altered. This will result in shifting of the valve so that the lead of the valve will be adjusted.

Mounted in the frame 10 is a tumbling shaft 22 one end of which carries an arm 23 that is connected by a rod 24 to a reversing lever 25, having a latch bolt of ordinary construction arranged to engage the notches of the locking quadrant 26. The outer end of the shaft carries an arm 28 from which is suspended a link 29 and the lower end of the link is connected by a pin 30 to a second link 31, the forward end of which is fulcrumed on the frame 10. On the pin 30 is fulcrumed a two armed lever 33 the upper and lower ends of which are connected by rods 35 to the straps of a pair of eccentrics mounted on the axle of the forward driver, these eccentrics being preferably arranged in the manner usually practiced in link motions and transmitting to the lever 33 a movement somewhat similar to that imparted to the ordinary link. Projecting from the upper and lower ends of the lever 33 are pins 37 and 38, the pin 37 being arranged to enter the slot 13, and the pin 38 entering the slot 14, although only one pin is in working position at one time.

When the upper pin 37 is in engagement with the slot 13 and the engine is run forward the lever 33 will be rocked with the pin 30 as a center and the pin 37 being entered in the slot 13 will oscillate the bar 11 and will thus transmit movement to the valve rod 15. The extent of this movement is, of course, in direct proportion to the distance between the fulcrum of the bar 11 and the pin 37, and this distance may be altered by a suitable adjustment of the lever 25. By raising the lever 33 the stroke of the valve may be increased and its speed of travel also increased so as to cut off shortly after the commencement of the stroke of the piston, while by lowering the lever the length of the stroke and the speed may be decreased so as to admit steam for a greater length of time. When it is desired to reverse, the lever 25 is pulled back to the fullest extent, thus dropping the lever 33 so that the pin 37 will pass from the slot 13 and the lower pin 38 will enter slot 14, the pin being guided down into the slot by the flaring walls which merge from the circular portion of the opening 12 into the walls of said slot. When down in the slot 14 the same movement which, imparted to the lever when in the position shown in Fig. 1, would move the valve in a forward direction, will now move the valve in a rearward direction, and steam will therefore be admitted at the opposite end of the cylinder, and the direction of travel reversed. When the pin 38 is in the slot 14 the lever 25 may also be adjusted for the purpose of altering the point of cut off.

It will be obvious that with the lever 25 in an intermediate or neutral position the valve will have no travel, thus providing for movement on down grades without power.

What is claimed is:—

1. In a valve gear, a support, a valve rod, a pivotally suspended bar connected to said rod and provided at its lower portion with an enlarged opening and with a pair of alined slots that communicate with the opening, an eccentric actuated lever having a pair of pins arranged to enter said slots, a tumbling shaft, an arm extending therefrom, a link suspended from the arm and forming a pivotal support for the lever, a secondary link connecting the pivot point of the lever to the support, and a reversing lever connected to the tumbling shaft and adapted to adjust the position of the lever to thereby vary the point of cut off and reverse the engine.

2. In a valve gear, a valve rod, a pivotally suspended bar connected to said rod, and provided at its lower end with an opening, and with a pair of alined slots communicating with said opening, a lever pivotally supported intermediate its ends, and carrying pins on opposite sides of its pivot arranged to alternately enter the aforesaid slots, eccentrics connected to the respective ends of the lever, supporting links for the lever connected to the pivot thereof, and means for adjusting said links to shift the lever.

In testimony that I claim the foregoing as my own, I have hereto affixed my signature in the presence of two witnesses.

LYNN KING.

Witnesses:
JACK KING,
S. E. KING.